United States Patent
Hammond-Smith et al.

(10) Patent No.: US 6,953,611 B2
(45) Date of Patent: Oct. 11, 2005

(54) ANISOTROPIC POLYMER FILM

(75) Inventors: Robert Hammond-Smith, Dammerham (GB); John Patrick, Poole (GB); Alison Linda May, Wimborne (GB)

(73) Assignee: Merck Patent GmbH, Darmstadt (DE)

( * ) Notice: Subject to any disclaimer, the term of this patent is extended or adjusted under 35 U.S.C. 154(b) by 360 days.

(21) Appl. No.: 10/252,374

(22) Filed: Sep. 24, 2002

(65) Prior Publication Data

US 2003/0104144 A1 Jun. 5, 2003

(30) Foreign Application Priority Data

Sep. 25, 2001 (EP) .............................. 01122567

(51) Int. Cl.$^7$ .............................. C09K 19/52
(52) U.S. Cl. .................... 428/1.3; 252/299.01; 428/1.1; 349/180
(58) Field of Search ................ 349/175, 176, 349/179, 180, 185, 167, 168, 170, 172, 182, 183, 184, 186, 1, 19; 252/299.01, 299.7, 299.2, 299.5; 428/1.1, 1.2, 1.3, 1.31

(56) References Cited

U.S. PATENT DOCUMENTS

| | | | |
|---|---|---|---|
| 4,588,664 A | | 5/1986 | Fielding et al. |
| 5,210,630 A | * | 5/1993 | Heynderickx et al. ....... 349/183 |
| 5,241,408 A | * | 8/1993 | Ishikawa et al. .............. 349/76 |
| 5,258,134 A | | 11/1993 | Yoshinaga et al. |
| 5,384,069 A | | 1/1995 | Yoshinaga et al. |
| 5,619,352 A | * | 4/1997 | Koch et al. .................... 349/89 |
| 5,668,614 A | | 9/1997 | Chien et al. |
| 6,215,539 B1 | * | 4/2001 | Schadt et al. ............... 349/124 |
| 6,319,963 B1 | * | 11/2001 | Coates et al. ................... 522/1 |
| 6,421,107 B1 | | 7/2002 | Greenfield et al. |
| 6,459,847 B1 | | 10/2002 | Van De Witte et al. |
| 6,466,297 B1 | * | 10/2002 | Goulding et al. ........... 349/175 |
| 6,495,217 B2 | * | 12/2002 | Farrand ...................... 428/1.1 |
| 6,569,502 B1 | * | 5/2003 | Ito et al. ...................... 428/1.1 |
| 2002/0191945 A1 | | 12/2002 | Van De Witte et al. |

FOREIGN PATENT DOCUMENTS

| | | |
|---|---|---|
| DE | 0 261 712 | 3/1988 |
| DE | 44 05 316 | 8/1995 |
| DE | 195 04 224 | 8/1995 |
| DE | 44 08 171 | 9/1995 |
| EP | 0 292 244 | 11/1988 |
| EP | 0 376 344 | 7/1990 |
| WO | WO 93/22397 | 11/1993 |
| WO | WO 98/00428 | 1/1998 |
| WO | WO 98/12584 | 3/1998 |
| WO | WO 98/57223 | 12/1998 |
| WO | WO 00/34808 | 8/2000 |
| WO | WO 02/40614 | 5/2002 |

OTHER PUBLICATIONS

Japan Patent Abstract No. 2001 056484 dated Feb. 27, 2001.
Japan Patent Abstract No. 02 272090 dated Nov. 6, 1990.
Japan Patent Abstract No. 03 134092 dated Jun. 7, 1991.
Japan Patent Abstract No. 08 209127 dated Aug. 13, 1996.

* cited by examiner

*Primary Examiner*—Mark F. Huff
*Assistant Examiner*—Jennifer R. Sadula
(74) *Attorney, Agent, or Firm*—Millen, White, Zelano, Branigan, P.C.

(57) ABSTRACT

An anisotropic polymer film comprising a polymeriZed chiral liquid crystal material with helically twisted structure and having areas with different helical twist sense is useful for decorative or security applications.

30 Claims, No Drawings

ANISOTROPIC POLYMER FILM

FIELD OF THE INVENTION

The invention relates to an anisotropic polymer film comprising a polymerised chiral liquid crystal material with helically twisted structure having areas with different helical twist sense. The invention further relates to methods of preparing such a film, and to its use in decorative or security applications.

BACKGROUND AND PRIOR ART

The use of chiral liquid crystals to give coloured films that exhibit an angular colour dependence has been described in prior art. Typically, these films are prepared from a polymerisable cholesteric liquid crystal mixture that is coated onto a substrate and polymerised. The nature of these films is that they exhibit a helically twisted structure and reflect circular polarised light of a specific waveband. The reflected light has a wavelength that depends on the helical pitch and a "handedness" of polarisation that depends on the twist sense of the helix structure of the liquid crystal film.

The chiral liquid crystal materials used for the preparation of coloured films usually comprise a liquid crystal host mixture and one or more chiral dopants that induce a helical twist with a given twist sense in the host mixture. The pitch p of the molecular helix in the first approximation, which is sufficient for most practical applications, is inversely proportional to the concentration c of the chiral dopant in the liquid crystal host mixture according to equation (1):

$$p = \frac{1}{HTP} \cdot \frac{1}{c} \quad (1)$$

The proportionality factor is the helical twisting power (HTP) of the chiral dopant.

It is possible using the above described technology to undertake a two stage process and print or coat two different liquid crystal mixtures that differ only in the reflection wavelength of the reflected light, to form patterned polymer films with areas of different reflection colour. These films are useful as optical elements or for decorative or security applications, where they can be used as security markings exhibiting a visible pattern that is difficult to counterfeit.

However, the use of different mixtures and two coating steps complicates the manufacture of such films.

Another method to achieve patterned films is by using polymerisable chiral mixtures comprising a chiral compound that changes its structure upon irradiation, bringing about a change in the HTP of the compound and thus a change of the helical pitch and the reflection colour of the chiral mixture. In combination with a two-step irradiation and polymerisation process and conventional photomask techniques a patterned film with areas of different reflection colour can be formed. This is described for example in WO 00/034808. Furthermore, U.S. Pat. No. 5,668,614 describes the use of photoisomerisable compounds in multicolour cholesteric displays having regions of different reflection wavelength, but does not relate to patterned polymer films.

However, some applications especially in the security sector require films that exhibit a hidden pattern or image which can only be recognized by special means, e.g., when viewed through a polariser.

One aim of the present invention is to provide a polymer film with a hidden pattern that is stable against outside influences like heat, chemical solvents or mechanical stress, can be easily manufactured, and is suitable in particular as a false-proof security marking. Another aim is to provide methods for preparing such a film.

Upon further study of the specification and appended claims, further aims and advantages of this invention will become apparent to those skilled in the art.

These aims can be achieved by providing an anisotropic polymer film comprising a polymerised chiral liquid crystal material with helically twisted structure, wherein the helix axis is oriented substantially perpendicular to the plane of the film, and reflecting circularly polarised light, wherein the film further exhibits a pattern of different areas with different twist sense, leading to different polarisation state ("handedness") of the reflected light. The chiral liquid crystal material can be selected such that the areas with different handedness have the same reflection colour, so that the pattern is not visible to the naked eye, but is visible only when viewed through a circular polariser.

WO 98/57223 discloses the use of chiral photoisomerisable compounds for preparing a multi-domain liquid crystal display having different areas with different twist sense (handedness). However, it does not mention coated polymer films.

SUMMARY OF THE INVENTION

The invention relates to an anisotropic polymer film comprising a polymerised chiral liquid crystal material with helically twisted structure wherein the helix axis is oriented substantially perpendicular to the plane of the film, comprising at least one area with a helical twist sense that is different from that of at least one other area.

The invention further relates to a method of preparing an anisotropic polymer film, as described above and below, comprising providing a layer of a polymerisable chiral liquid crystal material comprising at least one first chiral compound that induces a helical twist of a given twist sense in the chiral material, and is convertible between at least two states with different twisting power, wherein conversion of the chiral compound can be induced by photoradiation and at least one second chiral compound that induces a helical twist of a twist sense opposite to said first chiral compound in the chiral material, and is not convertible between two or more states with different twisting power under the same conditions as said first chiral compound, irradiating selected regions of the layer with photoradiation that changes the degree of chirality of said first chiral compound, and polymerising said selected regions.

The invention further relates to the use of an anisotropic polymer film as described above and below in optical elements, decorative or security applications.

The invention further relates to a security, authentification or identification marking or device comprising an anisotropic polymer film as described above and below.

The invention further relates to a document of value comprising a security, authentification or identification marking or device as described above.

DEFINITION OF TERMS

The term 'film' as used in this application includes self-supporting, i.e., free-standing, films that show more or less pronounced mechanical stability and flexibility, as well as coatings or layers on a supporting substrate or between two substrates.

The term 'liquid crystal or mesogenic material' or 'liquid crystal or mesogenic compound' refers to materials or compounds comprising one or more rod-shaped, board-shaped or disk-shaped mesogenic groups, i.e., groups with the ability to induce liquid crystal phase behaviour. The compounds or materials comprising mesogenic groups do not necessarily have to exhibit a liquid crystal phase themselves. It is also possible that they show liquid crystal phase behaviour only in mixtures with other compounds, or when the mesogenic compounds or materials, or the mixtures thereof, are polymerised.

The term 'helically twisted structure' relates to a film comprising one or more layers of liquid crystal material wherein the mesogens are oriented with their main molecular axis in a preferred direction within molecular sublayers, with this preferred orientation direction in different sublayers being twisted around a helix axis that is substantially perpendicular to the film plane, i.e. substantially parallel to the film normal. This definition includes orientations of the helix axis from about 75 to 90°, preferably 80 to 90°, very preferably 85 to 90° and most preferably 88 to 90° relative to the film plane.

DETAILED DESCRIPTION OF THE INVENTION

The anisotropic polymer film according to the present invention is preferably prepared by coating a thin layer of a chiral polymerisable liquid crystal (LC) material onto a substrate, aligning the material so that the axis of the molecular helix is oriented substantially perpendicular to the plane of the layer, changing the chirality in selected parts of the layer by photoradiation, and fixing the chiral structure by polymerisation to obtain a patterned polymer film.

The polymerisable chiral liquid crystal (LC) material contains at least two chiral compounds with different twist sense. The first chiral compound is, for example, a photoisomerisable chiral compound that changes its HTP due to isomerisation upon photoradiation with a given wavelength, or upon photoradiation with a given wavelength and intensity. The second chiral compound does not change its HTP under the same conditions as the first compound. For example, the second chiral compound can be a non-isomerisable compound that does not change its HTP at all when subjected to photoradiation. It is also possible that the second chiral compound is a photoisomerisable chiral compound that changes its HTP under photoradiation of different wavelength and/or intensity than that used for the first chiral compound.

Anisotropic polymer films obtained from a polymerisable chiral LC material containing at least two chiral compounds, a first of which is a photoisomerisable chiral compound and a second is a non-isomerisable chiral compound as described above, are especially preferred.

A change of the total twist in selected parts of the polymerisable chiral LC material can now be achieved by appropriately selecting the amount and twisting power of the first and second chiral compound. For example, a suitable chiral LC material contains a photoisomerisable chiral compound and a non-isomerisable chiral compound, one of which is levorotatory and the other is dextrorotatory. The isomerisable compound has a larger absolute twisting power and/or is present in an excess amount compared to the non-isomerisable compound, so that the net twist sense of the chiral LC material is the same as the twist sense of the first chiral compound. Upon photoradiation of selected parts of the chiral LC material, the photoisomerisable chiral compound is converted into a form with different HTP, for example, its twisting power is reduced by partial or complete conversion of the chiral material into a lower HTP chiral material, whereas the non-isomerisable chiral compound does not change its HTP. As a result, the net twist sense in the selected parts of the chiral LC material is reversed.

In addition, the amount and chirality of the first and second chiral compound can be selected such that the net twist of the chiral LC material before and after photoradiation are different, and the reflection wavelength of the chiral LC material remains substantially the same in the selected parts before and after photoradiation. This allows the preparation of anisotropic polymer films, wherein the areas of different twist sense reflect light of substantially the same reflection colour. These films are especially preferred. When viewed under unpolarised light they exhibit a uniform reflection colour, and further contain a hidden pattern of areas with different twist sense that becomes visible only when viewed through a circular polariser.

It is also possible that in the anisotropic polymer film according to the invention the areas of different twist sense also have different reflection colour.

After the chirality is changed as described above in selected parts of the polymerisable chiral LC material, the material is polymerised in situ to permanently fix the chiral structure in the selected parts or in the entire LC material. Polymerisation can be carried out for example by photopolymerisation or thermal polymerisation. Photopolymerisation is preferred. Especially preferably polymerisation in the LC material is initiated by the same photoradiation that changes the chirality of said first chiral compound.

A particularly preferred embodiment of the present invention relates to an anisotropic polymer film prepared from a polymerisable chiral LC material that does not polymerise, or polymerises only slowly, in the presence of oxygen. A suitable chiral LC material for this embodiment can be formulated, for example, by selection of suitable photoinitiators that do not react or do not react well in the presence of oxygen. The film is prepared by irradiating selected regions of the polymerisable material with photoradiation that changes the HTP of said first chiral compound in the presence of oxygen, so that polymerisation is hindered, or inhibited, and subsequently polymerising the selected regions or the entire material in the absence of oxygen.

Preferably, polymerisation in the polymerisable chiral LC material according to this embodiment is faster than isomerisation of the first chiral compound, so that the chirality of the LC material in the unpolymerised parts does not change, or at least does not change substantially, during photopolymerisation.

It is also possible to achieve polymerisation, but no isomerisation, in the chiral material, for example, by using low intensity radiation to polymerise in selected regions and then higher intensity to polymerise the entire material, or by using different wavelengths to initiate isomerisation and polymerisation.

An anisotropic film according to this preferred embodiment can be prepared by coating the polymerisable chiral LC material onto a substrate in the presence of oxygen, e.g., in an air atmosphere, and subjecting selected areas of the coating to photoradiation. This is achieved for example by irradiation through a photomask. Alternatively, irradiation can be carried out in selected areas by means of a finely focussed radiation source, like, e.g., a laser. The photoradiation leads to a change of the chirality in the selected areas of the LC material as described above, whereas in the non-selected areas the chirality remains unchanged. Polymerisation in the entire coating is hindered by the presence of oxygen. Afterwards the entire coating is polymerised, e.g., by thermal polymerisation or photopolymerisation, in the absence of oxygen, to fix the chiral structure in the selected and non-selected areas. This is done, for example, by polymerisation under an inert gas atmosphere or by covering the coating with an oxygen barrier layer, like, e.g., a PET film. As a result, a patterned film is obtained with a chirality that is different in the selected and the non-selected areas.

Alternatively, an anisotropic polymer film according to this preferred embodiment can be prepared by a method comprising the following steps that are carried out in the presence of oxygen, A) providing a layer of a photopolymerisable chiral LC material that does not polymerise in the presence of oxygen and comprises first and second chiral compounds as described above, B) 1) covering selected areas of the layer with a substrate and irradiating the layer with photoradiation that changes the twisting power of said first chiral compound and initiates polymerisation of the chiral polymerisable material, wherein the substrate has the properties of an oxygen barrier layer and is transparent for the photoradiation, and 2) repeating the procedure of step B1 one or more times for at least one of the areas of the layer that were not covered with a substrate in the previous step.

In step B1, the chiral LC material is polymerised only in those areas of the layer that are covered by the substrate, which is transparent for photoradiation and excludes oxygen that could inhibit the polymerisation. Since polymerisation is faster than isomerisation, the chiral structure in the covered areas is permanently fixed before it changes substantially. In the uncovered areas, polymerisation is hindered by the presence of oxygen, so that isomerisation and thus a change of the chirality can take place. In step B2, the changed chiral structure in the previously uncovered parts is fixed by polymerisation under the transparent oxygen barrier substrate.

As a result, a patterned film is obtained with a chirality that is different in the covered and uncovered areas of step B1.

Preferably, irradiation in step B1 is carried out with an intensity that is high enough and/or for a period that is long enough so that the first chiral compound is completely isomerised in the uncovered areas, and thus the change of chirality is complete. In step B2 all previously uncovered areas are then polymerised, i.e., step B2 is carried out only once.

It is also possible, however, to carry out irradiation in step B1 such that the chirality in the uncovered areas is only changed to a certain degree, e.g., by using low radiation intensity or short radiation time. In a first step B2, only some of the previously uncovered areas of step B1 are then irradiated through the oxygen barrier substrate to polymerise and fix the changed structure, whilst in the still uncovered areas further isomerisation can occur, which is then fixed in a second or further step B2. Thus, a patterned film with more than two different areas having different reflection colour can be prepared.

As an alternative to the above described particularly preferred embodiment with the material that does not polymerise in the presence of oxygen, it is possible to use a chiral polymerisable LC material that polymerises in air, and to use low intensity radiation to isomerise selected regions of the material, and higher intensity radiation to polymerise the material.

The polymerisable chiral LC material used for the preparation of the anisotropic polymer film according to the present invention is preferably a chiral smectic or chiral nematic (cholesteric) liquid crystal material. Cholesteric liquid crystal materials are especially preferred.

The polymerisable chiral LC material is preferably dissolved or dispersed in an organic solvent and is polymerised or crosslinked during or after evaporation of the solvent.

Preferably the polymerisable chiral LC material comprises at least one first chiral compound that has a given twist sense and changes its HTP upon photoradiation and at least one second chiral compound that has a twist sense opposite to that of said first chiral compound, and does not change its HTP when subjected to the photoradiation under which said first chiral compound changes its HTP, and further comprises at least one polymerisable compound having at least one polymerisable group.

The polymerisable compound can also be said first and/or second chiral compound. Alternatively, the polymerisable compound is an additional polymerisable compound that is preferably liquid crystalline or mesogenic.

Very preferably the chiral polymerisable LC material comprises a1) at least one first chiral compound that has a given twist sense and changes its chirality upon photoradiation, which may in addition be polymerisable and/or mesogenic, a2) at least one second chiral compound that has a twist sense opposite to that of said first chiral compound and does not change its chirality when subjected to the photoradiation under which said first chiral compound changes its chirality, which may in addition be polymerisable and/or mesogenic, b) at least one polymerisable mesogenic compound having at least one polymerisable group, and c) a polymerisation initiator.

Especially preferred compounds for use as first and second chiral compound are those with a high helical twisting power (HTP), so that the amount of the chiral compound in the material can be reduced.

Chiral compounds changing their chirality upon photoradiation which can be used in the present invention are known to the expert. For example, photoisomerisable chiral materials can be used which show E-Z or cis-trans isomerisation upon photoirradiation and are thereby converted into a form with a different HTP, where they determine the pitch of the liquid crystal material to a different extent. Further suitable are photodegradable or (photo)tunable chiral materials (TCM) that change from chiral to achiral or to a racemic mixture upon photoirradiation, due to destruction of their chirality by photoelimination or photocleavage of the chiral center.

For example, suitable photoisomerisable chiral materials are those comprising menthone, camphor or nopinone derivatives or chiral stilbenes, as described by P. van de Witte et al., Liq. Cryst. 24 (1998), 819–27, J. Mat. Chem. 9 (1999), 2087–94 and Liq. Cryst. 27 (2000), 929–33 and A. Bobrovski et al., Liq. Cryst. 25 (1998), 679–687. Suitable TCMs comprising a photocleavable carboxylic acid group or aromatic keto group attached to the chiral center are disclosed in U.S. Pat. No. 5,668,614. Furthermore, F. Vicentini, J. Cho and L. Chien, Liq. Cryst. 24 (1998), 483–488 describe binaphthol derivatives as TCMs and their use in multicolour cholesteric displays.

Particularly preferred are polymerisable and photoisomerisable chiral materials comprising menthone, camphor or nopinone derivatives or chiral stilbenes as disclosed by P. van de Witte et al., Liq. Cryst. 24 (1998), 819–27, J. Mat. Chem. 9 (1999), 2087–94 and Liq. Cryst. 27 (2000), 929–33 and A. Bobrovski et al., Liq. Cryst. 25 (1998), 679–687.

Further preferred are polymerisable photoisomerisable chiral compounds like those disclosed in WO 02/40614. These compounds are preferably selected of formula I

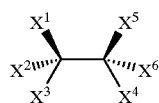

I wherein $X^1$, $X^2$, $X^3$, $X^4$, $X^5$ and $X^6$ independently of each other denote H, straight chain or branched alkyl with 1 to 50 C atoms wherein one or more $CH_2$ groups can also be replaced by —O—, —S—, —CO—, —$NR^0$—, —CH=CH—, or —C≡C— in such a manner that O and/or S atoms are not linked directly to one another and wherein one or more H-atoms can also be replaced by F or Cl, and/or one or more $CH_2$ groups can also be replaced by an aliphatic or aromatic carbocyclic or heterocyclic group with 3 to 65 C atoms that may also comprise fused and/or substituted rings, or two of $X^1$, $X^2$, $X^3$, $X^4$, $X^5$ and $X^6$ may also together form a cyclic group with up to 40 C atoms, wherein $X^1$ to $X^6$ may also contain a polymerizable group, with the provisos that $X^1 \neq X^2 \neq X^3$ and $X^4 \neq X^5 \neq X^6$, and that the compound comprises at least one photoisomerizable group and at least one mesogenic group, or at least one group that is photoisomerizable and mesogenic.

$X^1$, $X^2$, $X^3$, $X^4$, $X^5$ and $X^6$ are preferably selected from
a) H or straight chain or branched alkyl with 1 to 20 C atoms wherein one or more $CH_2$ groups can also be replaced by —O—, —S—, —CO—, —$NR^0$—, —CH=CH—, —C≡C— in such a manner that 0 and/or S atoms are not linked directly to one another and wherein one or more H-atoms can also be replaced with F or Cl,
b) —B-(Sp)$_n$-G, and
c) —B-(Sp)$_n$-($M^1$—$Z^1$)$_i$-(PI)$_k$-($Z^2$-$M^2$)$_l$-R;
   wherein two of $X^1$, $X^2$, $X^3$, $X^4$, $X^5$ and $X^6$ may also form together a cyclic group with up to 40 C atoms that is optionally substituted with one or more groups R, and
   $X^1 \neq X^2 \neq X^3$ and $X^4 \neq X^5 \neq X^6$,
$R^0$ is H or alkyl with 1 to 4 C atoms,
G is an aliphatic or aromatic carbocyclic or heterocyclic group with 3 to 40 C atoms that may also comprise fused rings and may also be substituted with one or more groups R,
R is H, halogen, $NO_2$, CN, SCN, $SF_5$, straight chain, branched or cyclic alkyl with 1 to 25 C atoms wherein one or more $CH_2$ groups can also be replaced by —O—, —S—, —CO—, —$NR^0$—, —CH=CH—, —C≡C— in such a manner that O and/or S atoms are not linked directly to one another, and wherein one or more H-atoms can also be replaced by F or Cl, or P-(Sp)$_n$-,
P is a polymerizable group,
Sp is a spacer group with 1 to 20 C atoms,
n is 0 or 1,
B is —O—, —S—, —$NR^0$—, —O—CO—, —$NR^0$—CO—, —O—COO—, —$OCH_2$—, —S—CO—, —S—COO— or a single bond,
PI is a photoisomerizable group that may in addition be mesogenic,
$M^1$ and $M^2$ are independently of each other a mesogenic group,
i, k and l are independently of each other 0 or 1,
$Z^1$ and $Z^2$ are independently of each other —O—, —S—, —CO—, —COO—, —OCO—, —CO—$NR^0$—, —$NR^0$—CO—, —$CH_2CH_2$—, —$CF_2CF_2$—, —$CH_2CF_2$—, —$OCH_2$—, —$CH_2O$—, —$SCH_2$—, —$CH_2S$—, —$CF_2O$—, —$OCF_2$—, —CH=CH—, —CF=CF—, —CH=CF—, —$(CH_2)_4$—, —CH=CH—COO—, —OCO—CH=CH—, —C≡C— or a single bond, and
at least one of $X^1$, $X^2$, $X^3$, $X^4$, $X^5$ and $X^6$ is —B-Sp-($M^1$—$Z^1$)$_i$-(PI)$_k$-($Z^2$-$M^2$)$_l$-G, and k in at least one of those groups is 1.

The mesogenic groups $M^1$ and $M^2$ are preferably of formula II

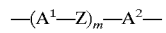

II wherein $A^1$ and $A^2$ are independently of each other selected from
A) 1,4-phenylene in which, in addition, one or more CH groups may be replaced by N,
B) 1,4-cyclohexylene in which, in addition, one or two non-adjacent $CH_2$ groups may be replaced by O and/or S,
C) 1,3-dioxolane-4,5-diyl, 1,4-cyclohexenylene, piperidine-1,4-diyl, 1,4-bicyclo-(2,2,2)-octylene, naphthalene-2,6-diyl, decahydro-naphthalene-2,6-diyl, 1,2,3,4-tetrahydronaphthalene-2,6-diyl or indane-2,5-diyl,
it being possible for all these groups to be unsubstituted, mono- or polysubstituted with L,
L is halogen, CN, SCN, $NO_2$, $SF_5$ or an alkyl, alkoxy, alkylcarbonyl or alkoxycarbonyl group with 1 to 4 C atoms, wherein one or more H atoms may be substituted with F or Cl,
z has in each case independently one of the meanings of $Z^1$ in formula I, and
m is 0, 1, 2 or 3.

The photoisomerizable group PI is preferably of formula III

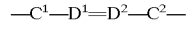

III wherein $D^1$ and $D^2$ are independently of each other CH or N or a saturated
C atom in a carbocyclic or heterocyclic 5- or 6-membered ring, and
$C^1$ and $C^2$ are independently of each other a bivalent aliphatic or aromatic carbocyclic or heterocyclic group with 3 to 40 C atoms that may also comprise fused rings, or $C^1$ or $C^2$ may also denote a single bond in case the respective adjacent group $D^1$ or $D^2$ is a C atom in a cyclic group.

Preferably, $C^1$ and $C^2$ have independently of each other one of the meanings of $M^1$ as defined in formula II, and are very preferably $A^2$, and $D^1$ and $D^2$ are independently of each other CH or N.

Very preferably $D^1$ and $D^2$ denote CH. Further preferred are compounds wherein $D^1$ and $D^2$ denote N.

Particularly preferably PI is selected from the following formulae

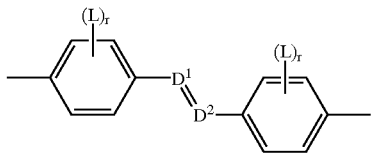
IIIa

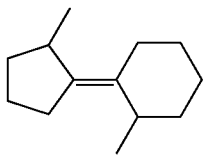
IIIb

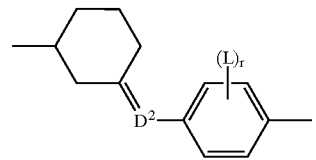
IIIc wherein $D^1$ and D2 are CH or N, L has the meaning given in formula II, and r is 0, 1, 2, 3 or 4.

Further preferred are compounds of formula I, wherein PI is of formula III and $C^1$ and/or $C^2$ are a mesogenic group $M^1$ or $M^2$ as defined in formula II. In case these compounds comprise additional mesogenic groups $M^1$ or $M^2$, these may be the same or different as $C^1$ and/or $C^2$.

Particularly preferred compounds of formula I are those of the following subformulae

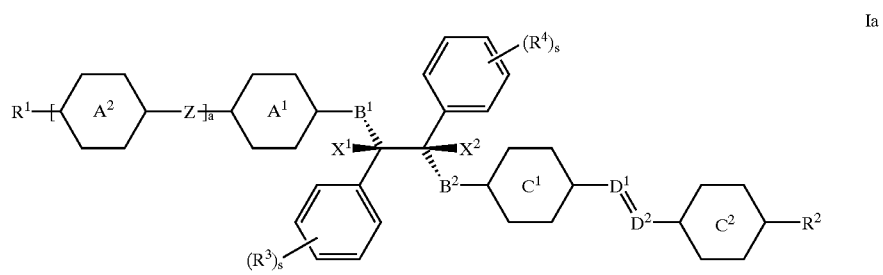
Ia

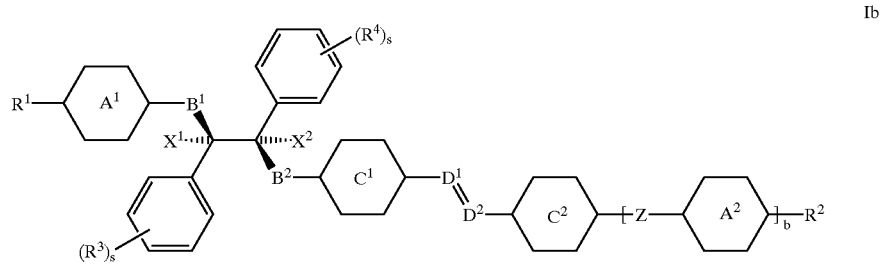
Ib

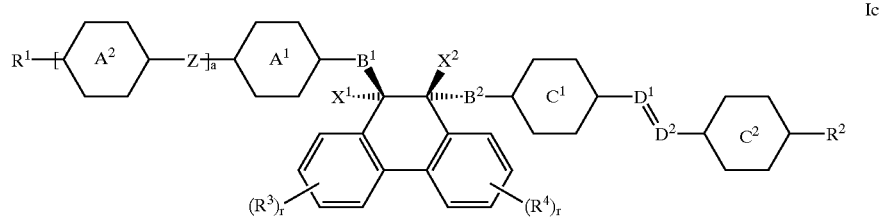
Ic

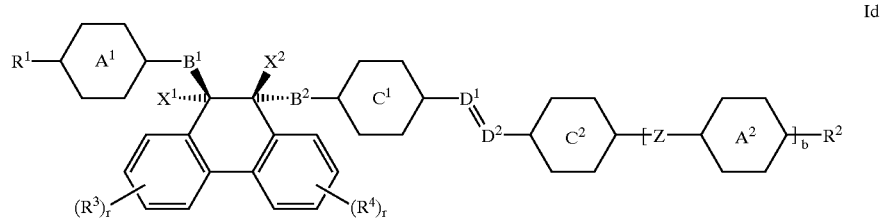
Id

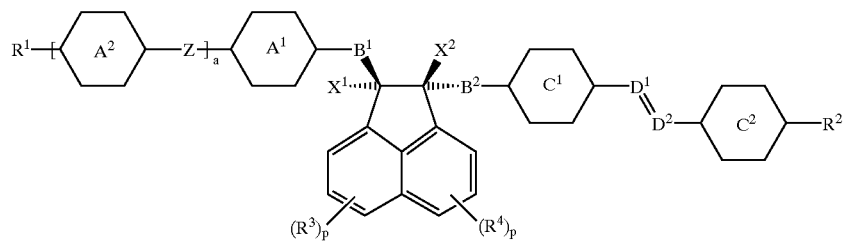
Ie
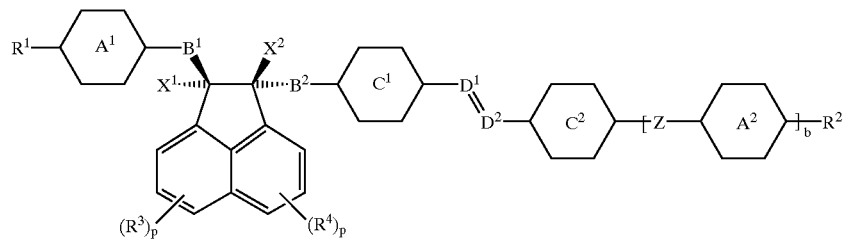
If
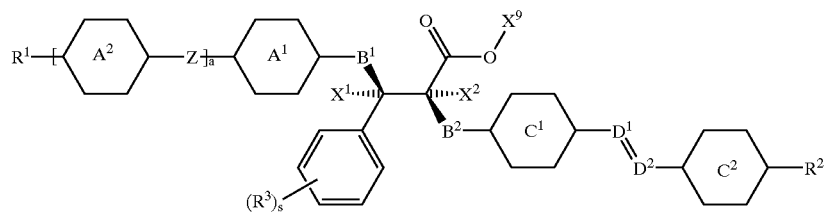
Ig
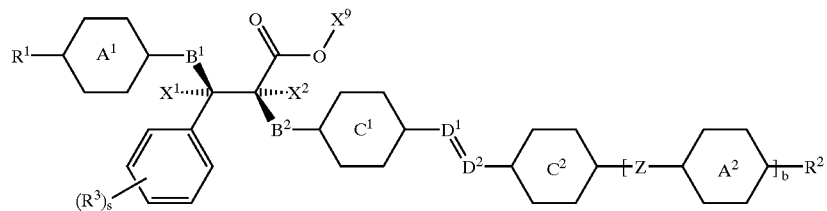
Ih
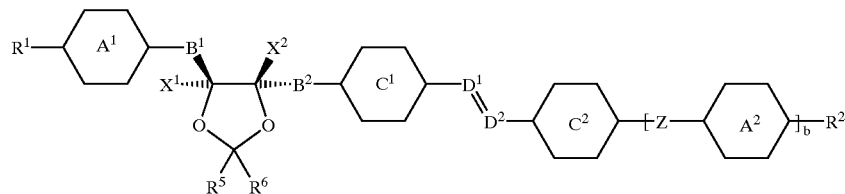
Ii
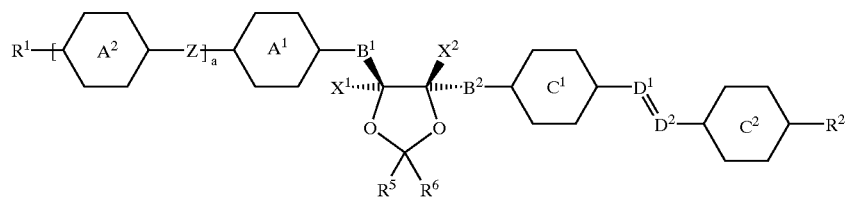
Ik wherein
- $A^1$, $A^2$, Z, $C^1$, $C^2$, $D^1$, $D^2$, $X^1$, $X^2$, and r have one of the meanings given above, $B^1$ and $B^2$ have independently of each other one of the meanings of B given above, $R^1$, $R^2$, $R^3$, $R^4$, $R^5$ and $R^6$ have independently of each other one of the meanings of R given above,
- $X^9$ is straight chain or branched alkyl with 1 to 25 C atoms wherein one or more $CH_2$ groups can also be replaced by —O—, —S—, —CO—, —$NR^0$—, —CH=CH—, —C≡C— in such a manner that O and/or S atoms are not linked directly to one another, and wherein one or more H-atoms can also be replaced by F or Cl, or denotes a cycloalkyl, phenyl, benzyl or fused carbocyclic or heterocyclic aliphatic or aromatic group with up to 25 C atoms that is optionally substituted with one or more groups R or L as defined in formula I, or P-(Sp)$_n$,
- a is 0, 1, 2 or 3,
- b is 1 or 2,
- p is 0, 1, 2 or 3, and
- s is 0, 1, 2, 3, 4 or 5.

The polymerisable chiral LC material further comprises a second chiral compound which does not change its chirality under the same conditions as the first chiral dopant. Preferably, the second chiral compound is a non-isomerisable compound. It can be polymerisable or not, and can also be mesogenic or liquid crystalline.

Especially preferred for use as non-isomerisable chiral compound in the present invention are compounds comprising a chiral sorbitol group with attached mesogenic groups, in particular compounds as disclosed in WO 98/00428. Further suitable chiral compounds are, e.g., the commercially available S 1011, R 811 or CB 15 (from Merck KGaA, Darmstadt, Germany).

Vey preferred are chiral compounds selected from the following formulae $Z^0$ is —COO—, —OCO—, —$CH_2CH_2$— or a single bond, and $R^7$ is alkyl, alkoxy, carbonyl or carbonyloxy with 1 to 12 C atoms.

The compounds of formula IV-1 are described in WO 98/00428, the compounds of formula IV-2 are described in GB 2,328,207, the entire disclosures of which are incorporated into this application by reference.

Especially suitable polymerisable, non-isomerisable chiral compounds can be taken from the lists below.

Further, the chiral compounds the polymerisable LC material preferably comprises at least one achiral polymerisable mesogenic compound having at least one polymerisable functional group.

In a preferred embodiment the polymerisable LC material comprises at least one chiral or achiral polymerisable mesogenic compound having two or more polymerisable functional groups (di- or multireactive or di-or multifunctional compounds). Upon polymerisation of such a mixture a three-dimensional polymer network is formed, which is self-supporting and shows a high mechanical and thermal stability and a low temperature dependence of its physical and optical properties. By varying the concentration of the multifunctional mesogenic or non mesogenic compounds the crosslink density of the polymer film and thereby its physical and chemical properties, in particular the temperature dependence of the optical properties, the thermal and mechanical stability and the solvent resistance, can be tuned easily.

The polymerisable mesogenic chiral or achiral, mono-, di- or multireactive compounds can be prepared by methods which are known per se and which are described, for example, in standard works of organic chemistry such as, for example, Houben-Weyl, Methoden der organischen Chemie, Thieme-Verlag, Stuttgart. Typical examples are described for example in WO 93/22397; EP 0 261 712; DE 19504224; DE 4408171 and DE 4405316, the entire disclosures of

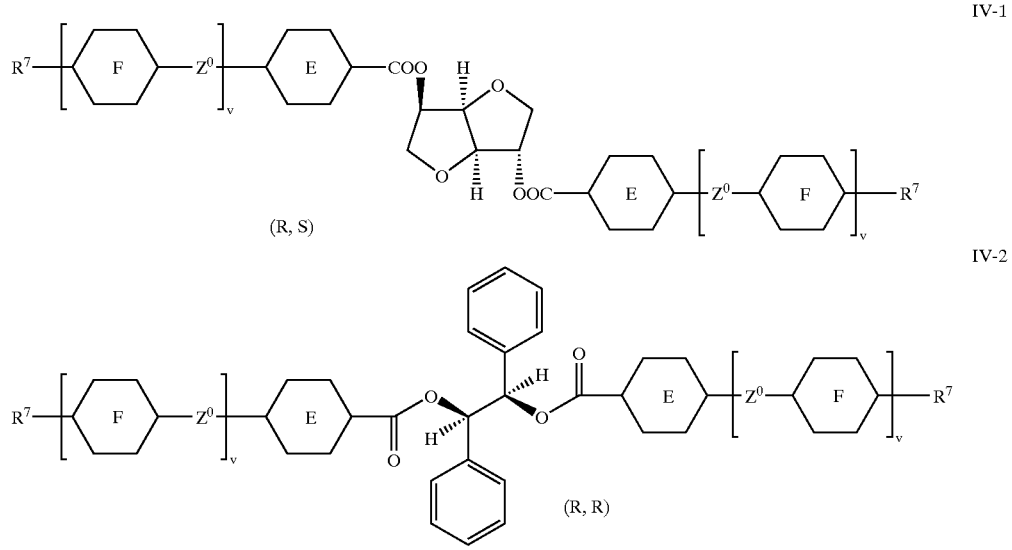

IV-1

IV-2 including the (R,S), (S,R), (R,R) and (S,S) enantiomers not shown, wherein E and F are each independently 1,4-phenylene that is optionally mono- di or trisubstituted by $L^1$ or 1,4-cyclohexylene, $L^1$ is H, F, Cl, CN or an optionally halogenated alkyl, alkoxy, alkylcarbonyl, alkoxycarbonyl or alkoxycarbonyloxy group with 1 to 7 C atoms, v is 0 or 1, which are incorporated into this application by reference. The compounds disclosed in these documents, however, are to be regarded merely as examples that do not limit the scope of this invention.

Examples representing especially useful chiral and achiral monoreactive polymerisable mesogenic compounds are shown in the following list of compounds, which should, however, be taken only as illustrative and is in no way intended to restrict, but instead to explain the present invention:

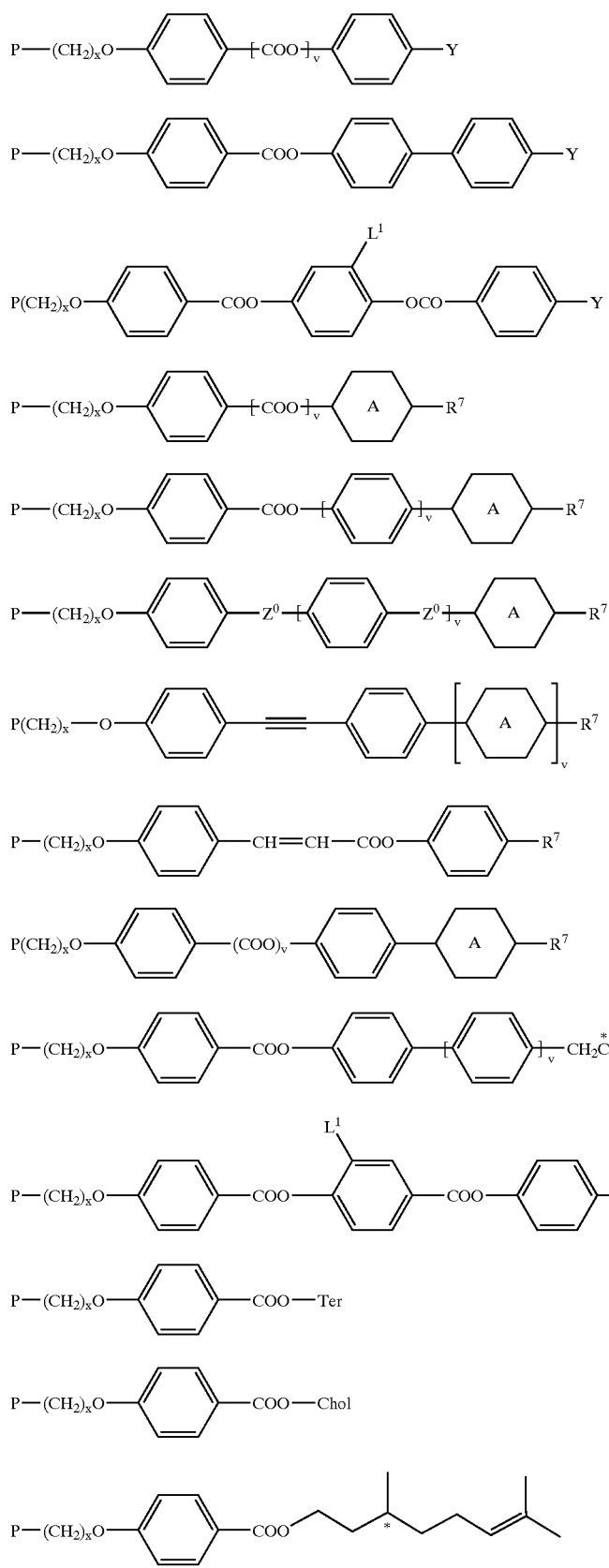

Examples of useful direactive chiral and achiral polymerisable mesogenic compounds are shown in the following list of compounds, which should, however, be taken only as illustrative and is in no way intended to restrict, but instead to explain the present invention

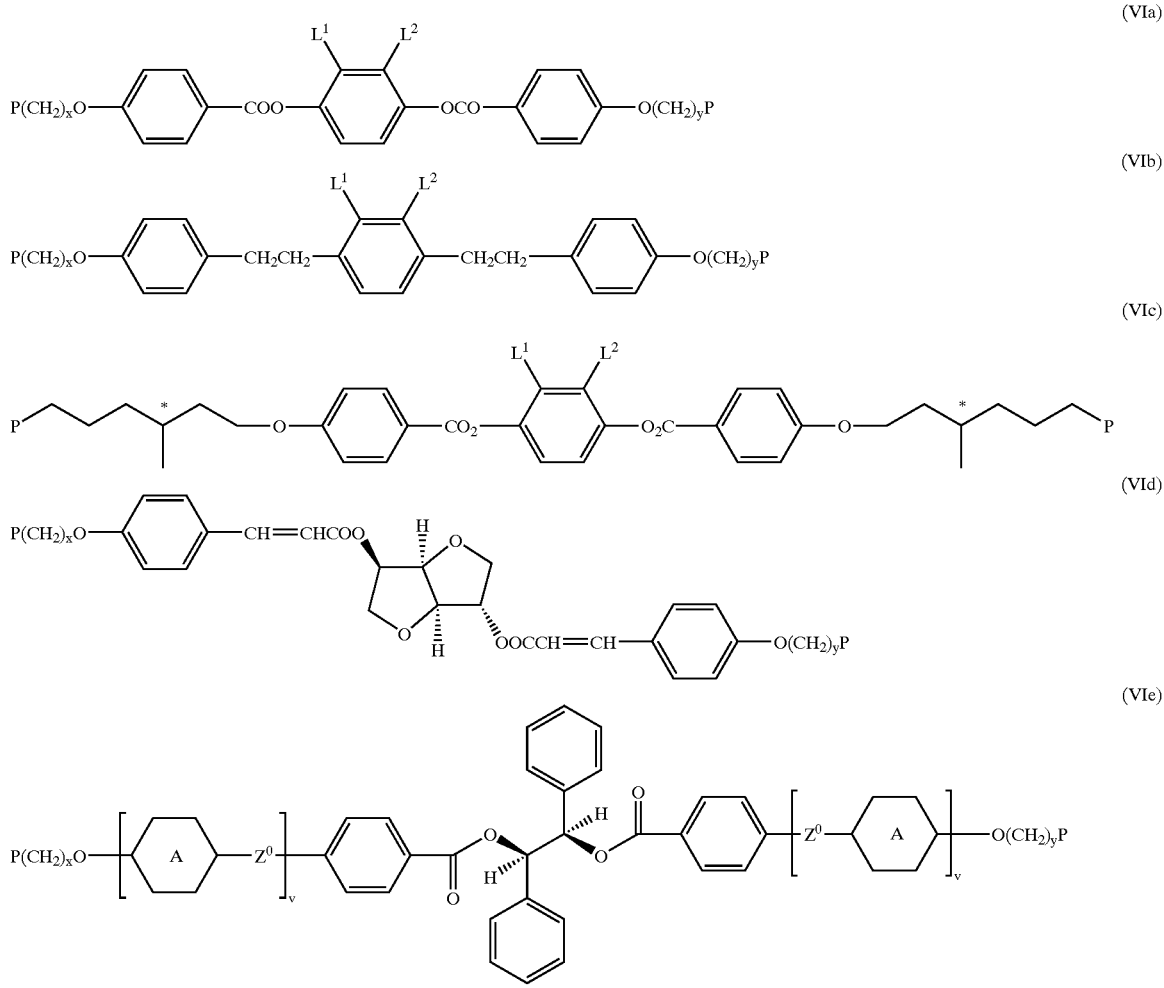

In the above formulae, P is a polymerisable group, preferably an acryl, methacryl, vinyl, vinyloxy, propenyl ether, epoxy or stytryl group, x and y are each independently 1 to 12, A is 1,4-phenylene that is optionally mono- di or trisubstituted by $L^1$ or 1,4-cyclohexylene, v is 0 or 1, $Z^0$ is —COO—, —OCO—, —CH$_2$CH$_2$— or a single bond, Y is a polar group, Ter is a terpenoid radical like e.g. menthyl, Chol is a cholesteryl group, $R^7$ is an non-polar alkyl or alkoxy group, and $L^1$ and $L^2$ are each independently H, F, Cl, CN or an optionally halogenated alkyl, alkoxy, alkylcarbonyl, alkoxycarbonyl or alkoxycarbonyloxy group with 1 to 7 C atoms.

The term 'polar group' in this connection means a group selected from F, Cl, CN, NO$_2$, OH, OCH$_3$, OCN, SCN, an optionally fluorinated carbonyl or carboxyl group with up to 4 C atoms or a mono- oligo- or polyfluorinated alkyl or alkoxy group with 1 to 4 C atoms. The term 'non-polar group' means an alkyl group with 1 or more, preferably 1 to 12 C atoms or an alkoxy group with 2 or more, preferably 2 to 12 C atoms.

Polymerisation of the polymerisable chiral LC material takes place by exposing it to heat or actinic radiation. Actinic radiation means irradiation with light, like UV light, IR light or visible light, irradiation with X-rays or gamma rays or irradiation with high energy particles, such as ions or electrons. Preferably, polymerisation is carried out by photoirradiation, in particular UV irradiation. As a source for actinic radiation for example a single UV lamp or a set of UV lamps can be used. When using a high lamp power the curing time can be reduced. Another possible source for photoradiation is a laser, like, e.g., a UV laser, an IR laser or a visible laser. Preferably, the photoradiation used for polymerisation is of the same wavelength, in particular of the same wavelength and intensity, as used for changing the chirality of the polymerisable LC material.

Polymerisation is carried out in the presence of an initiator absorbing at the wavelength of the actinic radiation. For example, when polymerising by means of UV light, a photoinitiator can be used that decomposes under UV irradiation to produce free radicals or ions that start the polymerisation reaction. When curing polymerisable mesogens with acrylate or methacrylate groups, preferably a radical photoinitiator is used, when curing polymerisable mesogens vinyl and epoxide groups, preferably a cationic photoinitiator is used. It is also possible to use a polymerisation initiator that decomposes when heated to produce free radicals or ions that start the polymerisation. As a photoinitiator for radical polymerisation, for example, the commercially available Irgacure® 651, Irgacure® 184, Darocure® 1173 or Darocure® 4205 (all from Ciba Geigy AG) can be used, whereas in case of cationic photopolymerisation the commercially available UVI 6974 (Union Carbide) can be used. The polymerisable LC material preferably comprises 0.01 to 10%, very preferably 0.05 to 5%, in particular 0.1 to 3% of a polymerisation initiator. UV photoinitiators are preferred, in particular radicalic UV photoinitiators. The photoinitiators can also be selected such that the chiral material does not, or does not well, polymerise in the presence of oxygen, as described above. For example, when polymerisation in air is required, Irgacure® 907 is preferably used, whereas Irgacure® 369 is used in a material that does not polymerise well in air.

The curing time is dependent, inter alia, on the reactivity of the polymerisable mesogenic material, the thickness of the coated layer, the type of polymerisation initiator and the power of the UV lamp. The curing time according to the invention is preferably not longer than 10 minutes, particularly preferably not longer than 5 minutes and very particularly preferably shorter than 2 minutes. For mass production short curing times of 3 minutes or less, very preferably of 1 minute or less, in particular of 30 seconds or less, are preferred.

The inventive polymerisable liquid crystalline mixtures can additionally comprise one or more other suitable components such as, for example, catalysts, sensitizers, stabilizers, chain-transfer agents, inhibitors, co-reacting monomers, surface-active compounds, lubricating agents, wetting agents, dispersing agents, hydrophobing agents, adhesive agents, flow improvers, defoaming agents, deaerators, diluents, reactive diluents, auxiliaries, colourants, dyes or pigments.

It is also possible, in order to increase crosslinking of the polymers, to add up to 20% of a non mesogenic compound with two or more polymerisable functional groups to the polymerisable LC material alternatively or in addition to the di- or multifunctional polymerisable mesogenic compounds to increase crosslinking of the polymer. Typical examples for difunctional non mesogenic monomers are alkyldiacrylates or alkyldimethacrylates with alkyl groups of 1 to 20 C atoms. Typical examples for non mesogenic monomers with more than two polymerisable groups are trimethylpropanetrimethacrylate or pentaerythritoltetraacrylate.

In another preferred embodiment the mixture of polymerisable material comprises up to 70%, preferably 3 to 50% of a non mesogenic compound with one polymerisable functional group. Typical examples for monofunctional non mesogenic monomers are alkylacrylates or alkylmethacrylates.

The anisotropic polymer film can be used with or without a substrate. As substrate any type of material can be used, like, for example, glass or quartz substrates, plastic films or sheets or metal surfaces. Preferably, the anisotropic polymer film is applied onto a dark or black substrate to improve visibility of the reflection colour.

The anisotropic polymer film can be directly prepared on the desired substrate, or alternatively it can be prepared on an auxiliary substrate which is removed after polymerisation, and can then be laminated onto the desired substrate.

The anisotropic polymer film may also be applied onto a reflective surface or substrate, which may also comprise additional security or decorative features, like for example a metal or metallised layer, embossed film, hologram, kinegram, hot stamping foil, pearlescent or interference pigment, or a layer comprising metal, metallised, pearlescent or interference pigments in a transparent binder. However, dark substrates are preferred.

The anisotropic polymer film may also be laminated to an optical phase shift or retardation layer, causing a phase shift of the light reflected by the film, like for example a quarter wave film or foil (QWF) exhibiting a net retardation that is approximately 0.25 times the wavelength transmitted by the film. If a QWF is applied, the circular polarised light reflected by the film is converted into linear polarised light, which can be more suitable for specific applications. This embodiment also has the feature that regions with different twist sense will be linearly polarised in mutually orthoganol directions and still provide a hidden image when viewed through a linear polariser.

As a retardation layer, it is possible to use uniaxially or biaxially stretched or compressed films of an isotropic polymer, like, e.g., polyethylene terephthalate (PET), polyvinyl alcohol (PVA), polycarbonate (PC), di- or triacetyl cellulose (DAC, TAC).

It is also possible to use a phase shift layer or retardation film comprising vitrified, polymerised or crosslinked LC material. For example, the phase shift films may comprise polymerised LC material with planar orientation, i.e., with its mesogenic groups oriented parallel to the plane of the layer, as described, e.g., in WO 98/04651, or polymerised LC material with tilted orientation, i.e., with its mesogenic groups oriented at an oblique angle to the plane of the layer, as described, e.g., in WO 98/12584. The entire disclosure of both documents is incorporated into this application by way of reference. The retardation layer can also comprise platelet shaped microflakes of a light retarding material dispersed in a light transmissive binder.

If desired, the anisotropic polymer film according to the present invention may also comprise a circular polariser on top of the chiral liquid crystal layer. The hidden pattern of different areas with different twist sense and same reflection colour is then directly visible to the eye, without the use of a separate polariser.

The anisotropic polymer films according to the present invention are especially suitable for use as hot stamping foils or holographic foils for the preparation of security markings and security threads. The preparation of holographic layers is described, e.g., in U.S. Pat. No. 4,588,664, the entire disclosure of which is incorporated into this application by way of reference. Hot stamping foils comprising liquid crystal material and their preparation are described in the unpublished UK patent application GB 0029163.

Due to their specific manufacturing process as described above, the anisotropic polymers according to the present invention exhibit a uniform colour that is viewing angle dependent, and in addition exhibits a visible image or pattern and/or a hidden image or pattern that can optionally be made visible. They can be used as optical element, like for example patterned polariser, polarisation beam splitter, colour filter, or as hidden or visible image or pattern for decorative or security uses.

A preferred application are security markings to authenticate and prevent counterfeiting of documents of value and/or for identification of hidden images, informations or patterns, for example on ID cards, credit cards, seals, stamps, ID tags, banknotes, licenses, shares, cheques, tickets, customs documents, or other documents of value. The anisotropic polymer films of this invention are particularly suitable for use in or as false-proof security threads or holograms on banknotes or documents of value, providing a security marking by which the banknote is easy to authenticate e.g. when viewed through a polariser.

Furthermore, the anisotropic polymer films can be applied to consumer products or household objects, foils, packing materials, clothes or woven fabric or incorporated into plastic.

The entire disclosure of all applications, patents and publications, cited above and below, and of corresponding European Patent Application No. 01 122 567.9, filed Sep. 25, 2001 is hereby incorporated by reference.

Without further elaboration, it is believed that one skilled in the art can, using the preceding description, utilize the present invention to ist fullest extent. The following examples are, therefore, to be construed as merely illustrative and not limitative of the remainder of the disclosure in any way whatsoever.

In the foregoing and in the following examples, unless otherwise indicated, all temperatures are set forth uncorrected in degrees Celsius and all parts and percentages are by weight.

EXAMPLE 1

The following polymerisable mixture was prepared

| Compound (A) | 3.99% |
|---|---|
| compound (B) | 6.82% |
| compound (C) | 1.00% |
| compound (D) | 0.98% |
| compound (E) | 3.96% |
| TPO | 1.45% |
| Toluene | 81.81% |

(A)

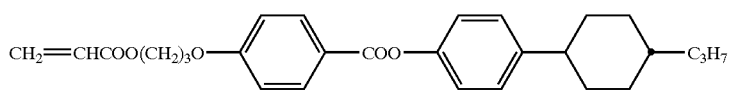

(B)

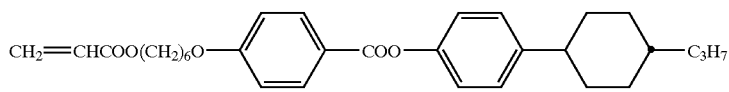

(C)

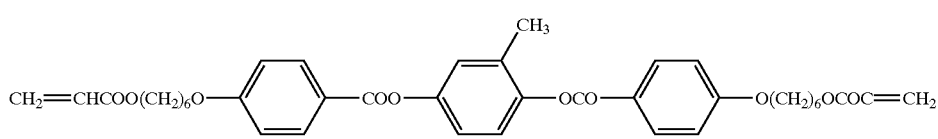

(D)

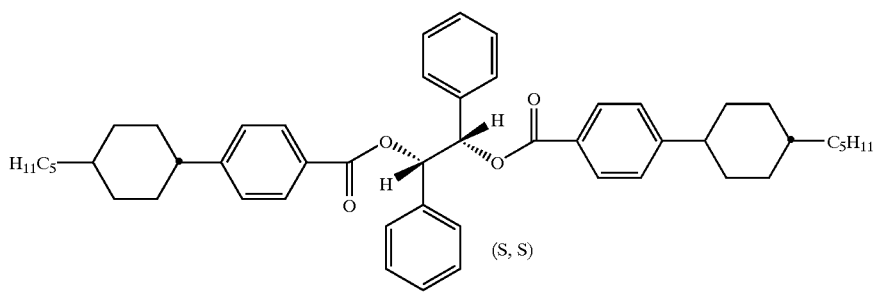

(E)

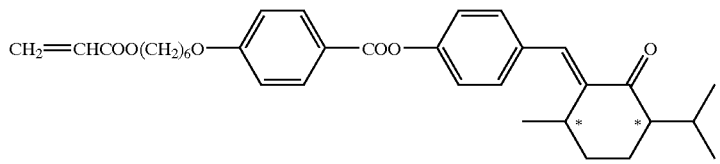

Compounds (A) and (B) are described in GB 2,280,445. Compound (C) can be prepared according to or in analogy to the methods described in D. J. Broer et al., Makromol.Chem. 190, 3201–3215 (1989). Compound (D) is described in GB 2,328,207. Compound (E) is described in van de Witte et al., Liq. Cryst. 24 (1998), 819–27. TPO (2,4,6-trimethylbenzoyl-diphenylphosphine oxide, Trademark Lucirine® TPO) is a commercially available photo-initiator (from BASF AG).

The solution was coated onto a black metallised PET substrate to form a wet coating of 24 microns thickness. The coating was left at room temperature until the solvent had evaporated, to leave a film of 4 microns thickness. The film has a shiny red colour when viewed under unpolarised light or through a left handed circular polariser. When the film is viewed through a right handed circular polariser no colour is seen.

A laminating layer of 12 microns clear PET was then applied to selected parts of the dry film. The PET film acts as an oxygen barrier to facilitate photopolymerisation in the laminated parts of the film. The film was then irradiated using a mercury vapour lamp for 20 seconds at an intensity of 30 mW/cm$^2$. At this point the film was cured under the laminate but the unprotected area was not cured since oxygen in the air hindered the polymerisation process.

A clear PET laminate layer as described above was then applied to the previously unprotected area and further irradiation was given as described above. The PET layer was then removed to leave the final coated film.

The final film has a uniform, red colour. When viewed through a right handed circular polariser, colour is only seen in the areas that were not protected for the first irradiation step. When viewed through a left handed circular polariser, colour is only seen in the areas that were protected for the first irradiation step.

By this technique it is possible to introduce hidden designs or text into a single coating of a cholesteric liquid crystal film.

The experiment described above is only representative for, but not limitative to the present invention. Other colours are possible by modifying the concentration of chiral dopants. The possibility of having coloured text on a coloured background with both colours reflecting different handedness of polarised light is also possible.

By using lasers it is possible to introduce the design onto a coated product and then apply a single laminate to the whole film before irradiation.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An anisotropic polymer film comprising a polymerised chiral liquid crystal material with helically twisted structure wherein the helix axis is oriented substantially perpendicular to the plane of the film, and comprising at least one area with a helical twist sense that is different from that of at least one other area.

2. An anisotropic polymer film according to claim 1, wherein the areas of different twist sense have substantially the same reflection wavelength.

3. An anisotropic polymer film according to claim 1, wherein the chiral liquid crystal material is a cholesteric liquid crystal material.

4. An anisotropic polymer film according to claim 1, obtainable by providing a layer of a polymerisable chiral liquid crystal material comprising
    at least one first chiral compound that induces a helical twist of a given twist sense in the chiral material, and is convertible between at least two states with different twisting power, wherein conversion of the chiral compound can be induced by photoradiation and
    at least one second chiral compound that induces a helical twist of a twist sense opposite to said first chiral compound in the chiral material, and is not convertible between two or more states with different twisting power under the same conditions as said first chiral compound,
    irradiating selected regions of the layer with photoradiation that changes the degree of chirality of said first chiral compound, and polymerising said selected regions.

5. An anisotropic polymer film according to claim 4, wherein said first chiral compound is a photoisomerisable chiral compound and said second chiral compound is a non-isomerisable chiral compound.

6. An anisotropic polymer film according to claim 4, wherein polymerisation of the chiral liquid crystal material is initiated by the photoradiation that changes the twisting power of said first chiral compound.

7. An anisotropic polymer film according to claim 4, wherein the chiral liquid crystal material is polymerised by thermal polymerisation.

8. An anisotropic polymer film according to at least one of claim 4, wherein polymerisation of the polymerisable chiral liquid crystal material is hindered in the presence of oxygen, and wherein selected regions of the polymerisable material are irradiated in the presence of oxygen with photoradiation that changes the chirality of said first chiral compound, and the selected regions or the entire material are subsequently polymerised in the absence of oxygen.

9. An anisotropic polymer film according to claim 8, wherein irradiation of the selected regions of the polymerisable material is carried out through a photomask.

10. An anisotropic polymer film according to claim 8, wherein irradiation of the selected regions of the polymerisable material is carried out by means of a finely focussed radiation source.

11. An anisotropic polymer film according to claim 4, obtainable by a process comprising the following steps that are carried out in the presence of oxygen,
    A) providing a layer of a photopolymerisable chiral liquid crystal material that does not polymerise in the presence of oxygen and comprises first and second chiral compounds as defined in claim 4,
    B) 1) covering selected areas of the layer with a substrate and irradiating the layer with photoradiation that changes the twisting power of said first chiral compound and initiates polymerisation of the chiral polymerisable material, wherein the substrate has the properties of an oxygen barrier layer and is transparent for the photoradiation, and
    2) repeating the procedure of step B1 one or more times for at least one of the areas of the layer that were not covered with a substrate in the previous step.

12. An anisotropic polymer film according to claim 4, wherein polymerisable chiral LC material comprises:
    at least one first chiral compound that has a given twist sense and changes its helical twisting power upon photoradiation and
    at least one second chiral compound that has a twist sense opposite to that of said first chiral compound, and does not change its helical twisting power when subjected to the photoradiation under which said first chiral compound changes its helical twisting power,
and further comprises at least one polymerisable compound having at least one polymerisable group.

13. An anisotropic polymer film according to claim 4, wherein said first chiral compound is of formula I:

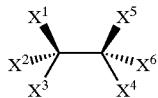   I wherein
$X^1$, $X^2$, $X^3$, $X^4$, $X^5$ and $X^6$ are each independently, H, straight chain or branched alkyl with 1 to 50 C atoms wherein one or more $CH_2$ groups are each optionally replaced by —O—, —S—, —CO—, —$NO^0$—, —CH=CH—, or —C≡C— in such a manner that O and/or S atoms are not linked directly to one another and wherein one or more H-atoms are each optionally replaced by F or Cl, and/or one or more $CH_2$ groups are each optionally replaced by an aliphatic or aromatic carbocyclic or heterocyclic group with 3 to 65 C atoms that may also comprise fused and/or substituted rings, or two of $X^1$, $X^2$, $X^3$, $X^4$, $X^5$ and $X^6$ together form a cyclic group with up to 40 C atoms, wherein $X^1$ to $X^6$ each optionally contain a polymerizable group, and wherein $R^0$ is H or alkyl with 1 to 4 C atoms,
with the provisos that $X^1 \neq X^2 \neq X^3$ and $X^4 \neq X^5 \neq X^6$, and that the compound comprises at least one photoisomerizable group and at least one mesogenic group, or at least one group that is photoisomerizable and mesogenic.

14. An anisotropic polymer film according to claim 13, wherein $X^1$, $X^2$, $X^3$, $X^4$, $X^5$ and $X^6$ are each selected from:
a) H or straight chain or branched alkyl with 1 to 20 C atoms wherein one or more $CH_2$ groups are each optionally replaced by —O—, —S—, —CO—, —$NR^0$—, —CH=CH—, —CH≡CH— in such a manner that O and/or S atoms are not linked directly to one another and wherein one or more H-atoms can each also be replaced by F or Cl,
b) —B-$(Sp)_n$-G, and
c) —B-$(Sp)_n$-$(M^1$-$Z^1)_i$-$(PI)_k$-$(Z^2$-$M^2)_l$-R,
wherein two of $X^1$, $X^2$, $X^3$, $X^4$, $X^5$ and $X^6$ may also form together a cyclic group with up to 40 C atoms that is optionally substituted with one or more groups R, and $X^1 \neq X^2 \neq X^3$ and $X^4 \neq X^5 \neq X^6$;
$R^0$ is H or alkyl with 1 to 4 C atoms;
G is an aliphatic or aromatic carbocyclic or heterocyclic group with 3 to 40 C atoms that may contain fused rings and is unsubstituted or substituted by one or more groups R;
R is H, halogen, $NO_2$, CN, SCN, $SF_5$, straight chain, branched or cyclic alkyl with 1 to 25 C atoms wherein one or more $CH_2$ groups are each optionally replaced by —O—, —S—, —CO—, —$NR^0$—, —CH=CH—, —C≡C— in such a manner that O and/or S atoms are not linked directly to one another, and wherein one or more H-atoms are each optionally replaced by F or Cl, or P-$(Sp)_n$-;
P is a polymerizable group;
Sp is a spacer group with 1 to 20 C atoms;
n is 0 or 1;
B is —O—, —S—, —$NR^0$—, —O—CO—, —$NR^0$—CO—, —O—COO—, —$OCH_2$—, —S—CO—, —S—COO— or a single bond;
PI is a photoisomerizable group that may in addition be mesogenic;

$M^1$ and $M^2$ are independently of each other a mesogenic group;
i, k and l are independently of each other 0 or 1;
$Z^1$ and $Z^2$ are independently of each other —O—, —S—, —CO—, —COO—, —OCO—, —CO—$NR^0$—, —$NR^0$—CO—, —$CH_2CH_2$—, —$CF_2CF_2$—, —$CH_2CF_2$—, —$OCH_2$—, —$CH_2O$—, —$SCH_2$—, —$CH_2S$—, —$CF_2O$—, —$OCF_2$—, —CH=CH—, —CF=CF—, —CH=CF—, —$(CH_2)_4$—, —CH=CH-COO—, —OCO—CH=CH—, —C≡C— or a single bond; and at least one of $X^1$, $X^2$, $X^3$, $X^4$, $X^5$ and $X^6$ is —B-Sp-$(M^1$—$Z^1)_i$-$(PI)_k$-$(Z^2$-$M^2)_l$-G, and k in at least one of those groups is 1.

15. An anisotropic polymer film according to claim 14, wherein mesogenic groups $M^1$ and $M^2$ are of formula II:

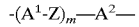   II wherein
$A^1$ and $A^2$ are each independently selected from
A) 1,4-phenylene in which one or more CH groups are each optionally replaced by replaced by N,
B) 1,4-cyclohexylene in which one or two non-adjacent $CH_2$ groups are each optionally replaced by O and/or S,
C) 1,3-dioxolane-4,5-diyl,1,4-cyclohexenylene, piperidine-1,4-diyl, 1,4-bicyclo-(2,2,2)-octylene, naphthalene-2,6-diyl, decahydro-naphthalene-2,6-diyl, 1,2,3,4-tetrahydronaphthalene-2,6-diyl or indane-2,5-diyl,
it being possible for each of these groups to be unsubstituted, mono- or polysubstituted with L,
L is halogen, CN, SCN, $NO_2$, $SF_5$, or an alkyl, alkoxy, alkylcarbonyl or alkoxycarbonyl group with 1 to 4 C atoms, wherein one or more H atoms are each optionally replaced by F or Cl,
Z is, in each case independently, —O—, —S—, —CO—, —COO—, —OCO—, —CO—$NR^0$—, $NR^0$—CO—, —$CH_2CH_2$—, —$CF_2CF_2$—, —$CH_2CF_2$—, —$OCH_2$—, —$CH_2O$—, —$SCH_2$—, —$CH_2S$—, —$CF_2O$—, —$OCF_2$—, —CH=CH—, —CF=CF—, —CH=CF—, —$(CH_2)_4$—, —CH=CH—COO—, —OCO—CH=CH—, —C≡C— or a single bond, and
m is 0, 1, 2 or 3.

16. An anisotropic polymer film according to claim 15, wherein PI is of formula III :

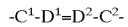   III wherein
$D^1$ and $D^2$ are each independently CH or N or a saturated C atom in a carbocyclic or heterocyclic 5- or 6-membered ring, and
$C^1$ and $C^2$ are each independently a bivalent aliphatic or aromatic carbocyclic or heterocyclic group with 3 to 40 C atoms that may comprise fused rings, or
$C^1$ or $C^2$ is a single bond in case the respective adjacent group $D^1$ or $D^2$ is a C atom in a cyclic group.

17. An anisotropic polymer film according to claim 16, wherein $C^1$ and $C^2$ are each independently selected from:
A) 1,4-phenylene in which one or more CH groups are each optionally replaced by replaced by N,
B) 1,4-cyclohexylene in which one or two non-adjacent $CH_2$ groups are each optionally replaced by O and/or S,
C) 1,3-dioxolane-4,5-diyl, 1,4-cyclohexenylene, piperidine-1,4-diyl,1,4-bicyclo-(2,2,2)-octylene, naphthalene-2,6-diyl, decahydro-naphthalene-2,6-diyl, 1,2,3,4-tetrahydronaphthalene-2,6-diyl or indane-2,5-diyl, and $D^1$ and $D^2$ are each independently CH or N.

18. An anisotropic polymer according to claim 14, wherein PI is selected from the following formulae:

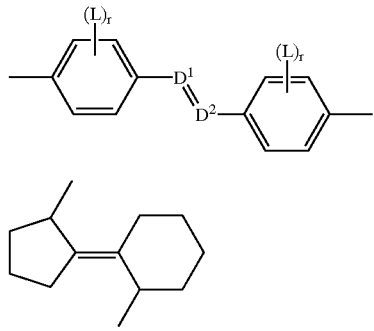

IIIa

IIIb

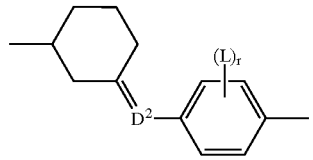

IIIc wherein $D^1$ and $D^2$ are CH or N,

L is halogen, CN, SCN, $NO_2$, $SF_5$, or an alkyl, alkoxy, alkylcarbonyl or alkoxycarbonyl group with 1 to 4 C atoms, wherein one or more H atoms are each optionally replaced by F or Cl, and r is 0, 1, 2, 3 or 4.

19. An anisotropic polymer film according to claim 13, wherein said compound of formula I is of the following subformulae:

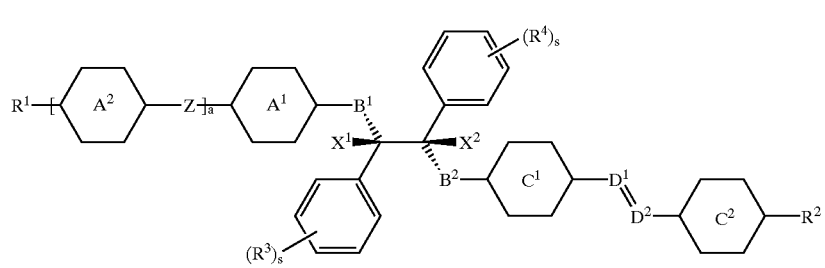

Ia

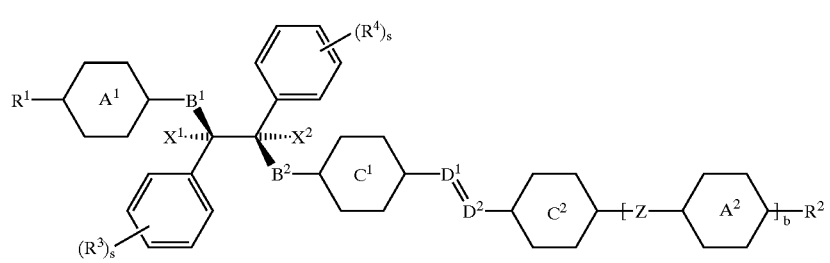

Ib

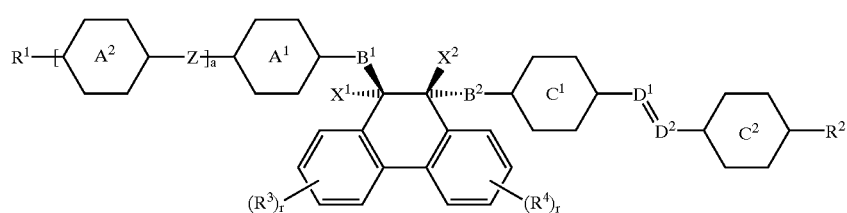

Ic

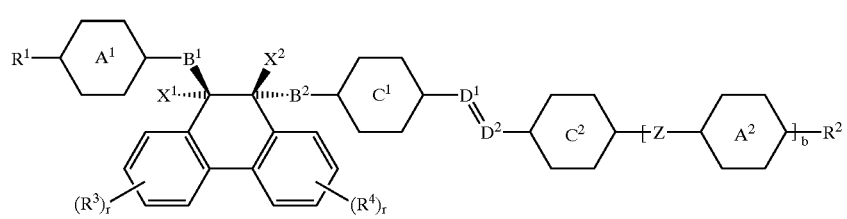

Id

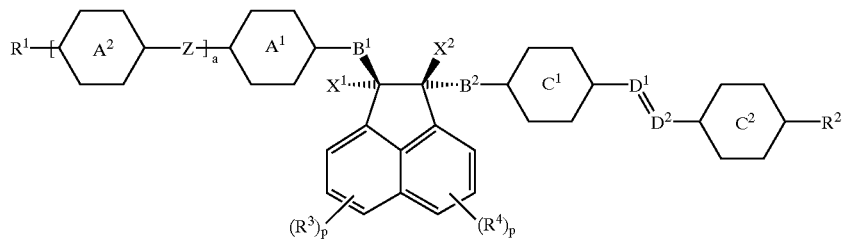
Ie
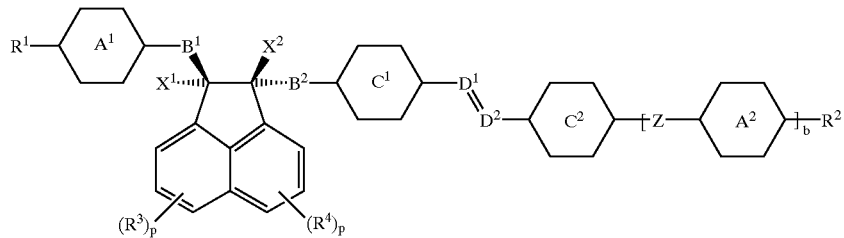
If
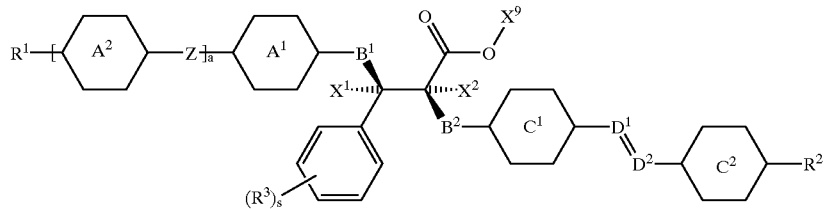
Ig
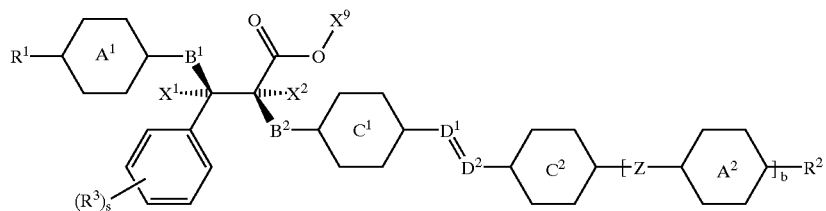
Ih
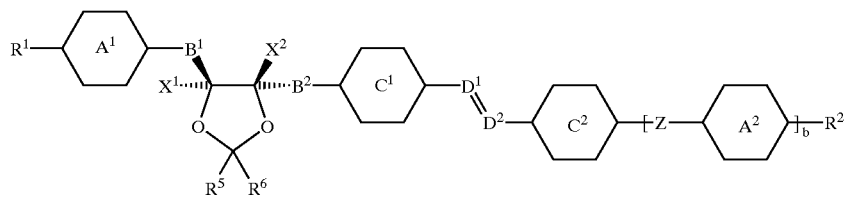
Ii
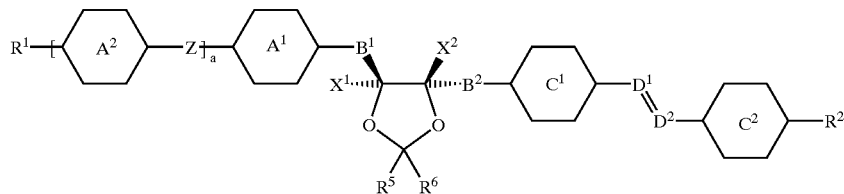
Ik wherein
A¹ and A² are each independently selected from
A) 1,4-phenylene in which one or more CH groups are each optionally replaced by replaced by N,
B) 1,4-cyclohexylene in which one or two non-adjacent CH₂ groups are each optionally replaced by O and/or S,
C) 1,3-dioxolane-4,5-diyl,1,4-cyclohexenylene, piperidine-1,4-diyl,1,4-bicyclo-(2,2,2)-octylene, naphthalene-2,6-diyl, decahydro-naphthalene-2,6-diyl, 1,2,3,4-tetrahydronaphthalene-2,6-diyl or indane-2,5-diyl,
it being possible for each of these groups to be unsubstituted, mono- or polysubstituted with L,
Z is, in each case independently, —O—, —S—, —CO—, —COO—, —OCO—, —CO—NR⁰—, —NR⁰—CO—, —CH₂CH₂—, —CF₂CF₂—, —CH₂CF₂—, —OCH₂—, —CH₂O—, —SCH₂—, —CH₂S—, —CF₂O—, —OCF₂—, —CH=CH—, —CF=CF—, —CH=CF—, —(CH₂)₄—, —CH=CH—COO—, —OCO—CH=CH—, —C≡C— or a single bond, and B¹ and B² is —O—, —S—, —NR⁰—, —O—CO—, —NR⁰—CO—, —O—COO—, —OCH₂—, —S—CO—, —S—COO— or a single bond,
X⁹ is straight chain or branched alkyl with 1 to 25 C atoms wherein one or more CH₂ groups can also be replaced by —O—, —S—, —CO—, —NR⁰—, —CH=CH—, —C≡C— in such a manner that O and/or S atoms are not linked directly to one another, and wherein one or more H-atoms can also be replaced by F or Cl, or denotes a cycloalkyl, phenyl, benzyl or fused carbocyclic or heterocyclic aliphatic or aromatic group with up to 25 C atoms that is optionally substituted with one or more groups R or L as defined in formula I, or P-(Sp)ₙ,
a is 0, 1, 2 or 3,
b is 1 or 2,
p is 0, 1, 2 or 3, and
s is 0, 1, 2, 3, 4 or 5.

20. An anisotropic polymer film according to claim 4, wherein said second chiral compound is of formulae:

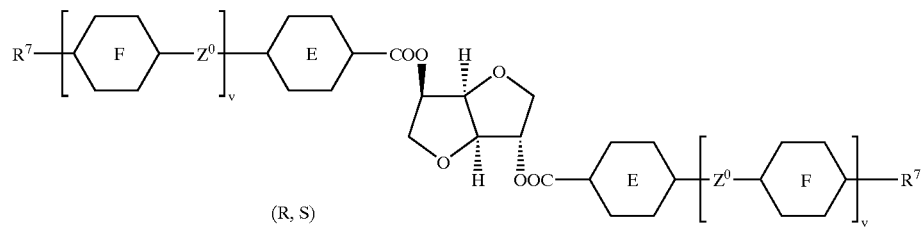

IV-1

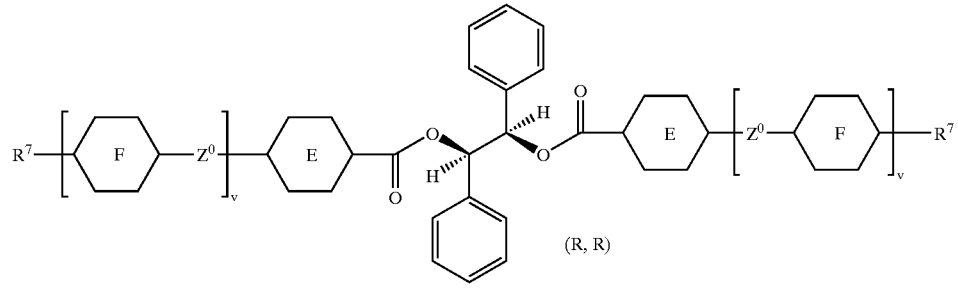

IV-2

D¹ and D² are each independently CH or N or a saturated C atom in a carbocyclic or heterocyclic 5- or 6-membered ring, and
C¹ and C² are each independently a bivalent aliphatic or aromatic carbocyclic or heterocyclic group with 3 to 40 C atoms that may comprise fused rings,
C¹ or C² is a single bond in case the respective adjacent group D¹ or D² is a C atom in a cyclic group,
r is 0, 1, 2, 3 or 4,
R¹, R², R³, R⁴, R⁵ and R⁶ are each independently H, halogen, NO₂, CN, SCN, SF₅, straight chain, branched or cyclic alkyl with 1 to 25 C atoms wherein one or more CH₂ groups are each optionally replaced by —O—, —S—, —CO—, —NR⁰—, —CH=CH—, —C≡C— in such a manner that O and/or S atoms are not linked directly to one another, and wherein one or more H-atoms are each optionally replaced by F or Cl, or P-(Sp)ₙ-, including the (R,S), (S,R), (R,R) and (S,S) enantiomers not shown, wherein E and F are each independently 1,4-cyclohexylene or 1,4-phenylene which is unsubstituted or mono- di or trisubstituted by L¹,
L¹ is H, F, Cl, CN or an optionally halogenated alkyl, alkoxy, alkylcarbonyl, alkoxycarbonyl or alkoxycarbonyloxy group with 1 to 7 C atoms,
v is 0 or 1,
Z⁰ is —COO—, —OCO—, —CH₂CH₂— or a single bond, and R⁷ is alkyl, alkoxy, carbonyl or carbonyloxy with 1 to 12 C atoms.

21. An anisotropic polymer film according to claim 20, wherein said chiral and achiral monoreactive or direactive polymerisable mesogenic compounds are selected from the following formulae:

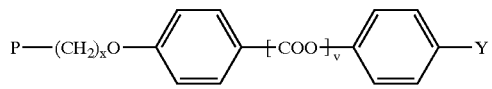 (Va)
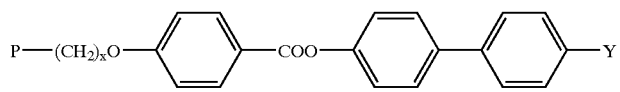 (Vb)
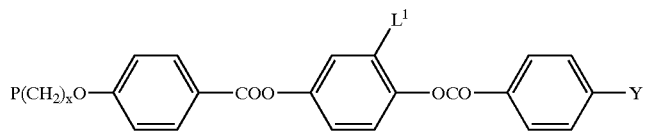 (Vc)
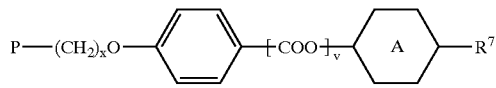 (Vd)
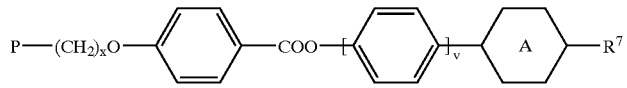 (Ve)
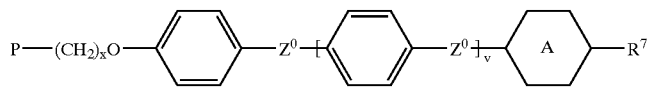 (Vf)
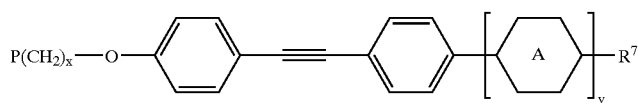 (Vg)
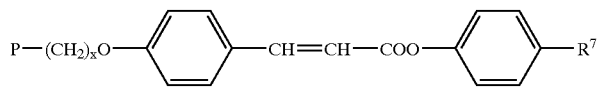 (Vh)
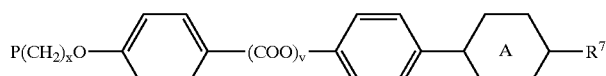 (Vi)
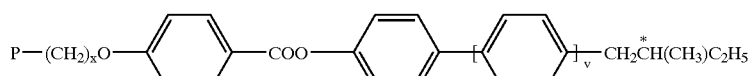 (Vk)
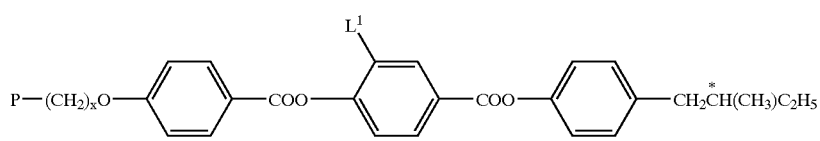 (Vm)
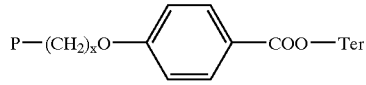 (Vn)
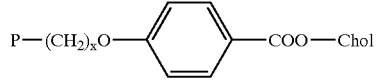 (Vo)
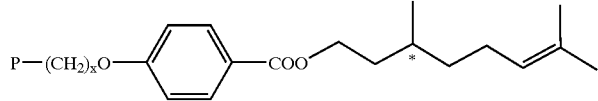 (Vp)

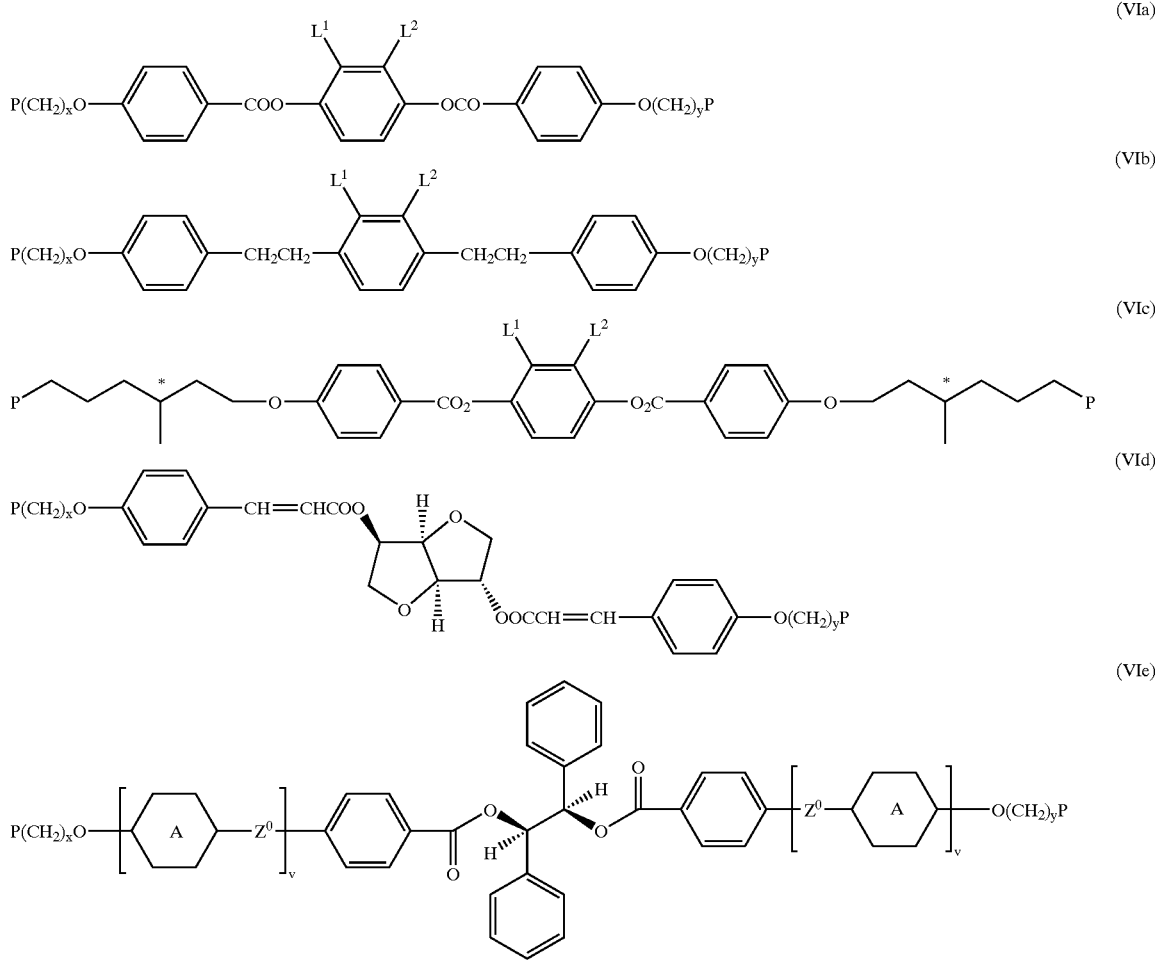

wherein
P is a polymerisable group,
x and y are each independently 1 to 12,
A is 1,4-cyclohexylene or 1,4-phenylene which is unsubstituted or mono- di or trisubstituted by $L^1$,
v is 0 or 1,
$Z^0$ is —COO—, —OCO—, —CH$_2$CH$_2$— or a single bond,
Y is a polar group,
Ter is a terpenoid radical,
Chol is a cholesteryl group,
$R^7$ is an non-polar alkyl or alkoxy group, and
$L^1$ and $L^2$ are each independently H, F, Cl, CN, alkyl with 1 to 7 C atoms, alkoxy with 1 to 7 C atoms, alkylcarbonyl with up to 7 C atoms, alkoxycarbonyl up to 7 C atoms, alkoxycarbonyloxy with up to 7 C atoms, halogenated alkyl with 1 to 7 C atoms, halogenated alkoxy with 1 to 7 C atoms, halogenated alkylcarbonyl with up to 7 C atoms, halogenated alkoxycarbonyl up to 7 C atoms, halogenated alkoxycarbonyloxy with up to 7 C atoms.

22. An anisotropic polymer film according to claim 4, wherein polymerisable chiral liquid crystal material comprises at least one chiral or achiral polymerisable mesogenic compound having two or more polymerisable functional groups.

23. An anisotropic polymer film according to claim 22, wherein 'polar group' is F, Cl, CN, NO$_2$, OH, OCH$_3$, OCN, SCN, an optionally fluorinated carbonyl or carboxyl group with up to 4 C atoms or a mono- oligo- or polyfluorinated alkyl or alkoxy group with 1 to 4 C atoms, and 'non-polar group' is an alkyl group with 1 to 12 C atoms or an alkoxy group with 2 to 12 C atoms.

24. An anisotropic polymer film according to claim 23, wherein polymerisable chiral liquid crystal material contains up to up to 70% of a non mesogenic compound with one polymerisable functional group.

25. An anisotropic polymer film according to claim 4, wherein polymerisable chiral liquid crystal material contains up to 20% of a non mesogenic compound with two or more polymerisable functional groups to the polymerisable LC material.

26. An anisotropic polymer film according to claim 4, wherein polymerisable chiral liquid crystal material contains up to up to 70% of a non mesogenic compound with one polymerisable functional group.

27. In an optical element, decorative application, or security application comprising an anisotropic polymer film, the improvement wherein said film is according to claim 1.

28. In a security, authentification or identification marking or device comprising an anisotropic polymer film the improvement wherein said film is according to claim 1.

29. An anisotropic polymer film according to claim 1, wherein the areas of different twist sense have different reflection color.

30. A method of preparing an anisotropic polymer film with helically twisted structure and comprising at least one area with a helical twist sense that is different from that of at least one other area, wherein at least one first chiral compound that induces a helical twist of a given twist sense in the chiral material, and is convertible between at least two states with different twisting power, wherein conversion of the chiral compound can be induced by photoradiation and at least one second chiral compound that induces a helical twist of a twist sense opposite to said first chiral compound in the chiral material, and is not convertible between two or more states with different twisting power under the same conditions as said first chiral compound, said method comprising:

irradiating selected regions of the layer with photoradiation that changes the degree of chirality of said first chiral compound, and polymerising said selected regions.

* * * * *

UNITED STATES PATENT AND TRADEMARK OFFICE
CERTIFICATE OF CORRECTION

PATENT NO. : 6,953,611 B2  
APPLICATION NO. : 10/252374  
DATED : October 11, 2005  
INVENTOR(S) : Robert Hammond-Smith Page 1 of 1

It is certified that error appears in the above-identified patent and that said Letters Patent is hereby corrected as shown below:

Column 25,  
Line 36, reads "—CH=CH-, -CH=CH-", should read -- —CH=CH-, -C≡C- --.  
Line 41, reads "—$(M^1-Z^1,_{,i}-(PI)_k$", should read -- $-(M^1-Z^1)_{i,}-(PI)_k$ --.

Column 26,  
Line 22, delete "by replaced".

Column 27,  
Line 7, reads "polymer according", should read -- polymer film according --.

Column 31,  
Line 4, delete "by replaced".

Column 36,  
Lines 49 and 57, reads "up to up to", should read -- up to --.

Signed and Sealed this

Twenty-seventh Day of June, 2006

JON W. DUDAS  
*Director of the United States Patent and Trademark Office*